(12) United States Patent
Nhep et al.

(10) Patent No.: US 7,860,365 B2
(45) Date of Patent: Dec. 28, 2010

(54) EDGE PROTECTOR FOR FIBER OPTIC CABLE ROUTING

(75) Inventors: Ponharith Nhep, Savage, MN (US); Trevor D. Smith, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/271,020

(22) Filed: Nov. 14, 2008

(65) Prior Publication Data

US 2009/0190894 A1  Jul. 30, 2009

Related U.S. Application Data

(60) Provisional application No. 60/988,695, filed on Nov. 16, 2007.

(51) Int. Cl.
G02B 6/00 (2006.01)
(52) U.S. Cl. ........................ 385/137; 385/135
(58) Field of Classification Search .................. 385/76, 385/134–137
See application file for complete search history.

(56) References Cited

U.S. PATENT DOCUMENTS

| | | | | |
|---|---|---|---|---|
| 4,911,510 A * | 3/1990 | Jenkins | | 385/136 |
| 5,530,787 A | 6/1996 | Arnett | | |
| 5,584,623 A | 12/1996 | Nadherny | | |
| 5,856,870 A | 1/1999 | Curtiss | | |
| 5,917,982 A * | 6/1999 | Vargas et al. | | 385/134 |
| 5,937,131 A | 8/1999 | Haataja et al. | | |
| 6,415,091 B1 | 7/2002 | Daub et al. | | |
| 6,418,262 B1 | 7/2002 | Puetz et al. | | |
| 6,424,781 B1 | 7/2002 | Puetz et al. | | |
| 6,522,823 B1 * | 2/2003 | Wentworth et al. | | 385/134 |
| 6,535,682 B1 | 3/2003 | Puetz et al. | | |
| 6,535,683 B1 * | 3/2003 | Johnson et al. | | 385/136 |
| 6,556,763 B1 | 4/2003 | Puetz et al. | | |
| 6,580,029 B1 * | 6/2003 | Bing | | 174/360 |
| 6,625,373 B1 | 9/2003 | Wentworth et al. | | |
| 6,685,364 B1 * | 2/2004 | Brezina et al. | | 385/92 |
| 6,760,531 B1 | 7/2004 | Solheid et al. | | |
| 6,763,169 B2 | 7/2004 | Wentworth et al. | | |
| 6,796,437 B2 | 9/2004 | Krampotich et al. | | |
| 6,809,258 B1 | 10/2004 | Dang et al. | | |
| 6,909,044 B2 * | 6/2005 | Ewer et al. | | 174/492 |
| 6,915,056 B2 | 7/2005 | Wentworth et al. | | |
| 6,981,750 B2 | 1/2006 | Krampotich | | |
| 7,102,084 B2 * | 9/2006 | Weinert et al. | | 174/135 |
| 7,139,461 B2 | 11/2006 | Puetz et al. | | |
| 7,149,398 B2 | 12/2006 | Solheid et al. | | |
| 7,155,104 B2 | 12/2006 | Wentworth et al. | | |
| 7,198,409 B2 | 4/2007 | Smith et al. | | |
| 7,200,317 B2 | 4/2007 | Reagan et al. | | |
| 7,218,827 B2 | 5/2007 | Vongseng et al. | | |
| 7,233,731 B2 | 6/2007 | Solheid et al. | | |
| 7,333,707 B2 | 2/2008 | Puetz et al. | | |
| 2002/0094184 A1 * | 7/2002 | Mattei et al. | | 385/134 |
| 2003/0165316 A1 | 9/2003 | Johnson et al. | | |
| 2007/0192817 A1 | 8/2007 | Landry et al. | | |

* cited by examiner

Primary Examiner—Daniel Petkovsek
(74) Attorney, Agent, or Firm—Merchant & Gould P.C.

(57) ABSTRACT

An edge protector for use with fiber optic cables includes a body having a first portion and a second portion. The first portion includes a first surface and an oppositely disposed second surface. The second portion includes a tang and a radius protrusion having a radius. The tang extends outwardly from the radius protrusion such that the tang extends beyond the second surface.

5 Claims, 10 Drawing Sheets

EDGE PROTECTOR FOR FIBER OPTIC CABLE ROUTING

CROSS REFERENCE TO RELATED APPLICATION

The present application claims the benefit of U.S. Provisional Patent Application Ser. No. 60/988,695, filed Nov. 16, 2007, which application is hereby incorporated by reference in its entirety.

TECHNICAL FIELD

The present disclosure relates to fiber optic cables, and more particularly, to fiber optic cable routing.

BACKGROUND

Fiber optic cables are frequently used as a medium in telecommunication networks to transmit signals between a central office and an end user. Each of these fiber optic cables includes at least one optical fiber that extends through the fiber optic cable. The optical fiber is a glass fiber that guides light along its length.

In the field of telecommunications, optical fiber is advantageous over electrical cables as light propagates through the optical fibers with little attenuation (i.e., loss in amplitude and intensity of an optical signal as the signal travels through the optical fiber). However, optical fibers can be subjected to attenuation losses.

Attenuation losses in optical fibers are generally categorized as either intrinsic or extrinsic. Intrinsic losses are those losses that result from inherent characteristics of the optical fiber, such as impurities in the optical fiber. Extrinsic losses, on the other hand, are those losses that occur as a result of external influences, such as bending of the optical fiber.

Specifications for optical fibers include a minimum bend radius for each of the optical fibers, where the minimum bend radius for an optical fiber is the maximum bend an optical fiber can withstand without being subjected to attenuation losses. While it is preferred to route fiber optic cables so as not to violate the minimum bend radius of the optical fibers in those cables, such cable routing can be difficult if the fiber optic cable is to be routed around edges and through holes in a residential or business premises.

SUMMARY

An aspect of the present disclosure relates to an edge protector for use with fiber optic cables. The edge protector includes a body having a first portion and a second portion. The first portion includes a first surface and an oppositely disposed second surface. The second portion includes a tang and a radius protrusion having a radius. The tang extends outwardly from the radius protrusion such that the tang extends beyond the second surface.

Another aspect of the present disclosure relates to a method for routing cable over an edge protector. The method includes providing an edge protector having a first portion with a first surface and an oppositely disposed second surface and a second portion having a radius portion and a tang that extends outwardly from the radius portion. A main surface of a support is abutted to the second surface of the first portion of the edge protector. The tang of the edge protector is positioned so that it is adjacent to a secondary surface of the support. A cable is routed over the radius portion of the second portion of the edge protector.

Another aspect of the present disclosure relates to a fiber optic network kit having a fiber distribution hub with at least one optical splitter. The fiber distribution hub is adapted for optical communication with a feeder cable from a central office. A fiber optic enclosure includes a housing, a cable spool, which is disposed on an exterior surface of the housing, and a mounting plate that is engaged with the cable spool assembly such that the cable spool assembly and the housing selectively and unitarily rotate about an axis of the mounting plate. The fiber optic network kit further includes a plurality of edge protectors having a body with a first portion and a second portion. The first portion includes a first surface and an oppositely disposed second surface while the second portion includes a radius portion and a tang that extends outwardly from the radius portion in an outwardly direction from the second surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
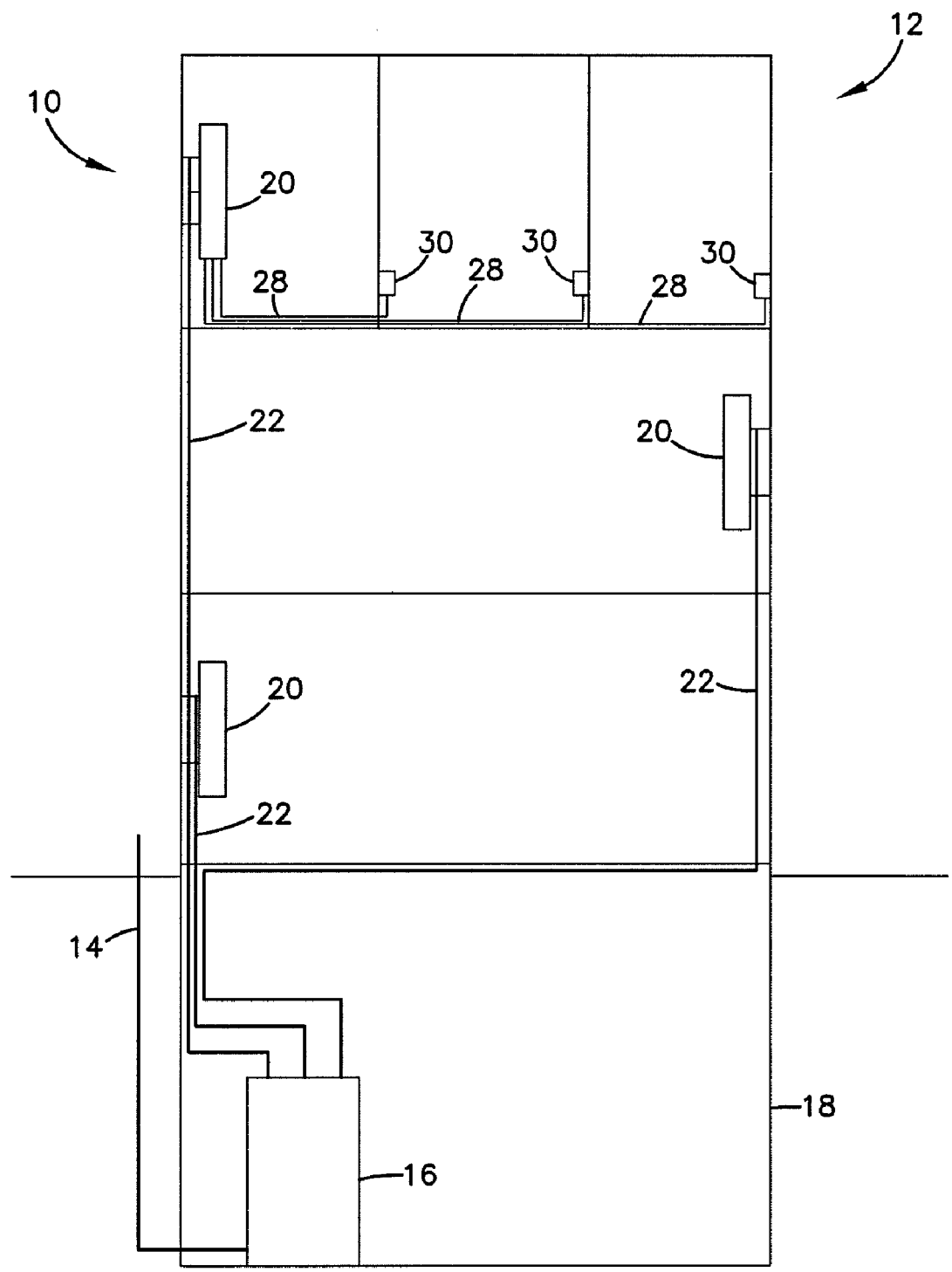
FIG. 1 is a schematic representation of a fiber optic network having exemplary features of aspects in accordance with the principles of the present disclosure.
Figure 2:
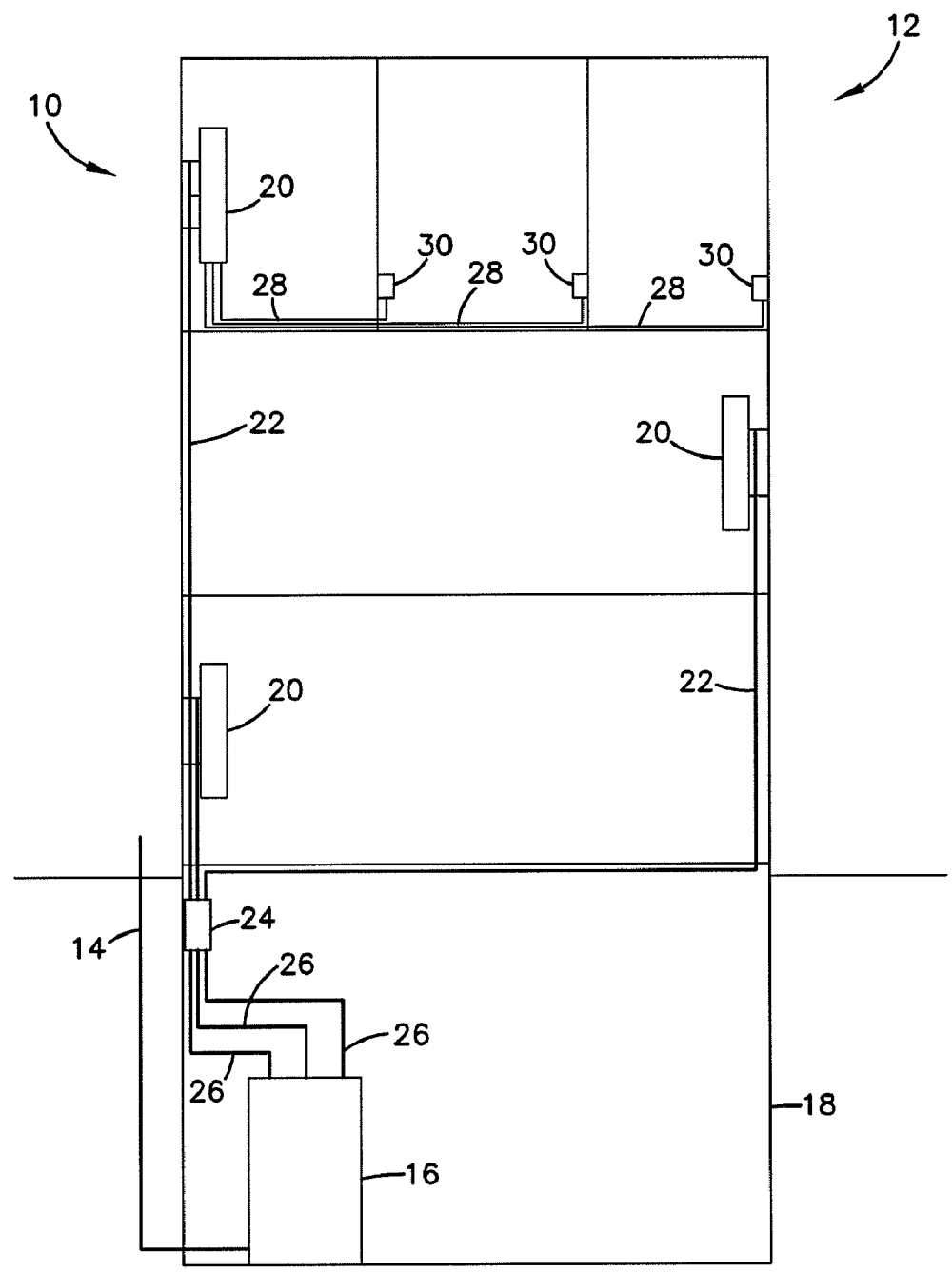
FIG. 2 is an alternate schematic representation of the fiber optic network of FIG. 1.

Referring now to FIGS. 1 and 2, schematic representations of a fiber optic network, generally designated 10, are shown. In the subject embodiment, the fiber optic network 10 is in a multiple dwelling unit, generally designated 12, (e.g. individual residence, apartment, condominium, business, etc.). The fiber optic network 10 includes a feeder cable 14 from a central office (not shown). The feeder cable 14 enters a fiber distribution hub 16 having one or more optical splitters (e.g., 1-to-8 splitters, 1-to-16 splitters, or 1-to-32 splitters) that generate a number of individual fibers. An exemplary fiber distribution hub 16 has been described in U.S. patent application Ser. No. 11/544,951, which is hereby incorporated by reference in its entirety.

In the subject embodiment, and by way of example only, the fiber distribution hub 16 is located on a lower level 18 of the multiple dwelling unit 12. Each unit in the multiple dwelling unit 12 includes a fiber optic enclosure 20. The fiber optic enclosure 20 has been described in U.S. Patent Application Ser. Nos. 60/916,495, 60/954,210, 60/954,214, 60/970,185, all of which are hereby incorporated by reference in their entirety.

A subscriber cable 22 is connected to fiber distribution hub 16 such that the fiber optic enclosure 20 and the fiber distribution hub 16 are in optical communication. The subscriber cable 22 extending between the fiber distribution hub 16 and the fiber optic enclosure 20 typically includes multiple optical fibers. In one embodiment, the subscriber cable 22 includes a connectorized end having a single-fiber connector or a multi-fiber connector. In the schematic representation shown in FIG. 1, the subscriber cable 22 extends from each of the fiber optic enclosures 20 and is directly connected to the fiber distribution hub 16.

In the schematic representation shown in FIG. 2, the subscriber cables 22 associated with the fiber optic enclosure 20 extend from the fiber optic enclosures 20 to an intermediate connector 24, which is in connected engagement with the fiber distribution hub 16 through an intermediate cable 26. In one embodiment, the intermediate connector 24 includes a plurality of adapters for optically coupling the connectorized end of the subscriber cable 22 to a connectorized end of the intermediate cable 26.

A plurality of optical fibers 28 are routed from the fiber optic enclosure 20 to an end location 30. In one embodiment, the optical fibers 28 include an outer jacket having an outer diameter of three millimeters. It will be understood, however, that the scope of the present disclosure is not limited to the optical fibers 28 having a jacket with an outer diameter of three millimeters.

As the optical fibers 28 are routed to the end location 30, the maximum bend specification for the optical fibers 28 should be adhered to in order to avoid attenuation losses. While adherence to this bend specification proves difficult as the optical fibers 28 are routed over and around edges/corners and through holes en route to the end location 30, an edge protector, generally designated 100 (shown in FIGS. 3-9), reduces the risk of attenuation of the optical fibers 28 and the subscriber cable 22 as those cables are routed within the multiple dwelling unit 12.

Figure 3:
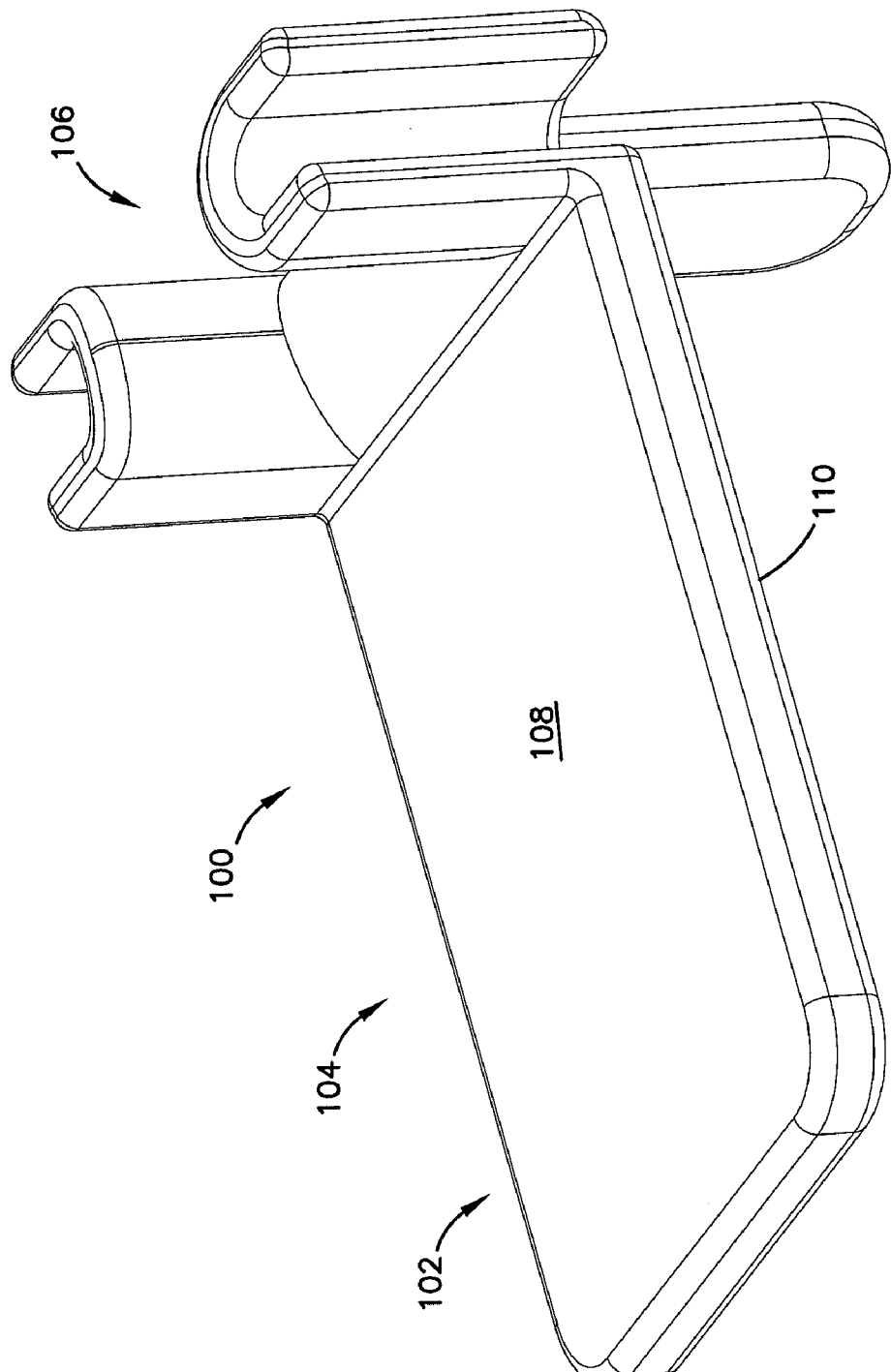
FIG. 3 is a perspective view of an edge protector having exemplary features of aspects in accordance with the principles of the present disclosure.
Figure 4:
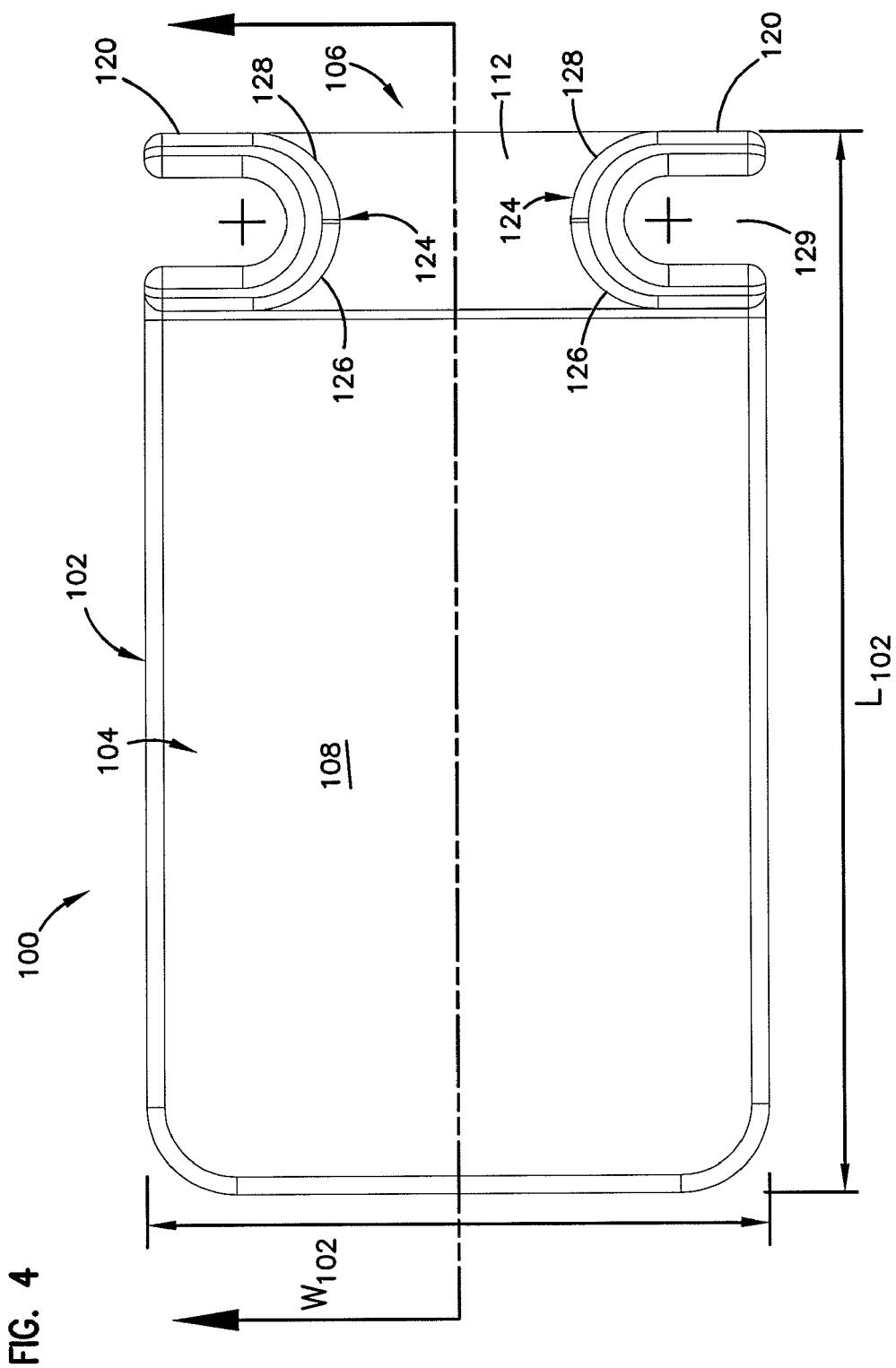
FIG. 4 is a top view of the edge protector of FIG. 3.

Referring now to FIGS. 3 and 4, the edge protector 100 for routing subscriber cable 22 and optical fibers 28 within the multiple dwelling unit 12 is shown. The edge protector 100 includes a body, generally designated 102, having a first portion, generally designated 104, and a second portion, generally designated 106. The body 102 of the edge protector 100 has a length $L_{102}$ and a width $W_{102}$ (shown in FIG. 4). In the subject embodiment, and by way of example only, the length $L_{102}$ is greater than 0.5 inches. In one embodiment, the length $L_{102}$ is in a range of about 0.5 inches to about 2.5 inches. In another embodiment, the length $L_{102}$ is in a range of about 1 inch to about 2 inches. In another embodiment, the length $L_{102}$ is in a range of about 1 inch to about 1.5 inches. In another embodiment, the length $L_{102}$ is about 1.2 inches. In the subject embodiment, and by way of example only, the width $W_{102}$ is greater than about 0.5 inches. In one embodiment, the width $W_{102}$ is in a range of about 0.5 inches to about 1.5 inches. In another embodiment, the width $W_{102}$ is in a range of about 0.5 inches to about 1 inch. In another embodiment, the width $W_{102}$ is about 0.7 inches. In the subject embodiment, the first portion 104 is generally planar. It will be understood, however, that the scope of the present disclosure is not limited to the first portion 104 being generally planar.

In the subject embodiment, the first portion 104 is generally rectangular in shape. It will be understood, however, that the scope of the present disclosure is not limited to the first portion 104 being generally rectangular in shape. The first portion 104 of the body 102 includes a first surface 108 and an oppositely disposed second surface 110. In the subject embodiment, the first surface 108 and the second surface 110 are generally parallel. It will be understood, however, that the scope of the present disclosure is not limited to the first and second surfaces 108, 110 being generally parallel.

Figure 5:
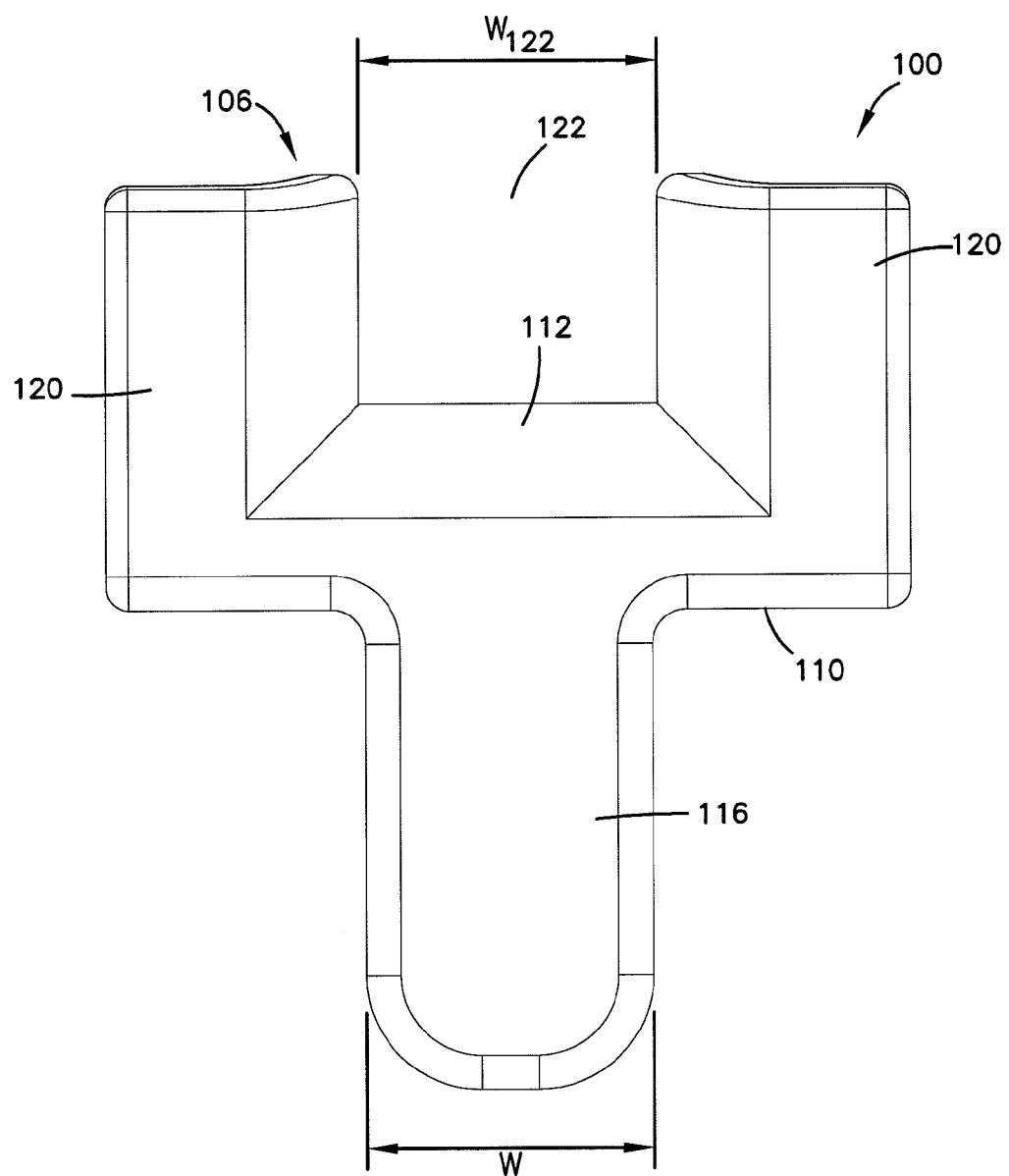
FIG. 5 is a right side view of the edge protector of FIG. 3.
Figure 6:
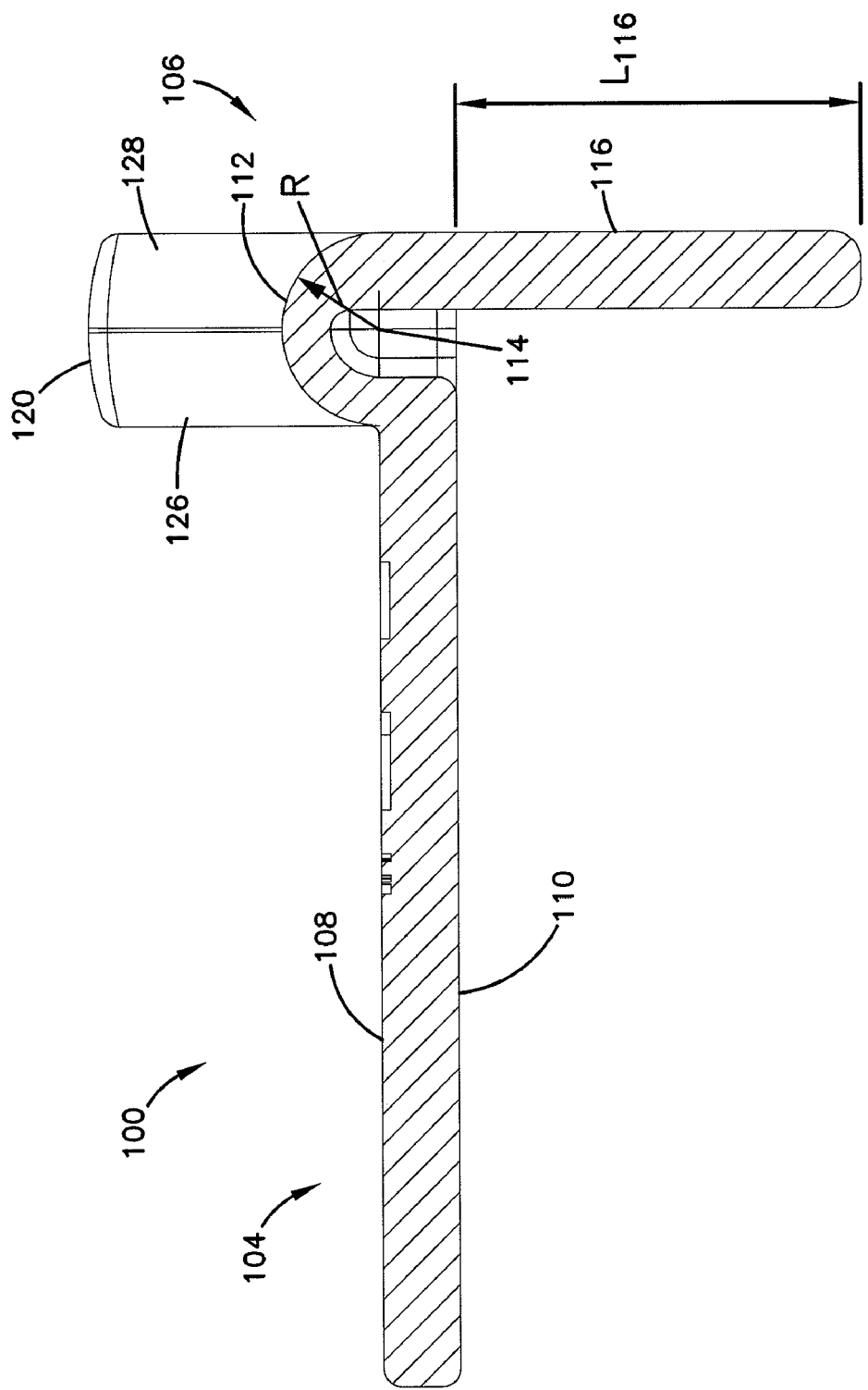
FIG. 6 is a cross-sectional view of the edge protector taken on line 6-6 of FIG. 4.

Referring now to FIGS. 5 and 6, the second portion 106 includes a radius protrusion 112. The radius protrusion 112 includes a radius R (shown as an arrow in FIG. 6) having a center 114 (shown as a "+" in FIG. 6). To be effective against attenuation losses, the radius R of the radius protrusion 112 is sized to be greater than the minimum bend radius of the optical fiber 28. In the subject embodiment, and by way of example only, the radius R is greater than 0.05 inches. In another embodiment, the radius R is in the range of about 0.05 inches to about 0.5 inches. In another embodiment, the radius R is in the range of about 0.05 inches to about 0.2 inches. In another embodiment, the radius R is about 0.1 inches.

In the subject embodiment, the center 114 of the radius protrusion 112 is generally aligned with the first surface 108. It will be understood, however, that the present disclosure is not limited to the radius protrusion 112 having a center 114 that is generally aligned with the first surface 108. As the center 114 is generally aligned with the first surface 108, the radius protrusion 112 extends outwardly from the first surface 108. It may be advantageous for the radius protrusion 112 to extend outwardly from the first surface 108 as this allows for a larger radius R, which may be necessary for certain optical fibers 28, while keeping the body 102 of the edge protector 100 thin. By keeping the body 102 of the edge protector 100 thin, the material costs associated with the edge protector 100 will be reduced and the ability to secure the edge protector 100 to a structure will be improved. It will be understood, however, that the scope of the present disclosure is not limited to the radius protrusion 112 extending outwardly from the first surface 108 as the radius protrusion could also be tangent to the first surface 108.

The second portion 106 further includes a tang 116. In the subject embodiment, the tang 116 is tangent to the radius protrusion 112 such that the tang extends in an outwardly direction from the second surface 110. It will be understood, however, that the scope of the present disclosure is not limited to the tang 116 being tangent to the radius protrusion 112. In the subject embodiment, the tang 116 extends a distance $L_{116}$ beyond the second surface 110. By way of example only, the tang 116 extends a distance $L_{116}$ that is in the range of 0.1 inches to about 1 inch beyond the second surface 110. In one embodiment, the tang 116 extends a distance $L_{116}$ that is in the range of about 0.25 inches to about 0.5 inches beyond the second surface 110. The tang 116 is generally rectangular in shape and sized to have a width W. It will be understood, however, that the scope of the present disclosure is not limited to the tang 116 being generally rectangular in shape. The width W of the tang 116 is sized for insertion into a hole 118 (shown in FIG. 7). In the subject embodiment, and by way of example only, the width W is less than the width $W_{102}$ (shown in FIG. 4) of the body 102. In the subject embodiment, and by way of example only, the width W is greater than 0.1 inches. In one embodiment, the width W is in the range of about 0.1 inches and about 1 inch. In another embodiment, the width W is in the range of about 0.1 inches and about 0.5 inches. In another embodiment, the width W is about 0.25 inches.

Referring now to FIGS. 4-6, the second portion 106 further includes a tab, generally designated 120, that extends outwardly from the radius protrusion 112 in an outwardly direction from the first surface 108. In the subject embodiment, and by way of example only, there are two tabs 120. The tabs 120 are disposed on opposite sides of the radius protrusion 112 such that the radius protrusion 112 and the tabs 120 define a channel 122. The channel 122 provides a path between the first surface 108 of the first portion 104 and the tang 116. In the subject embodiment, a width $W_{122}$ of the channel 122 is about equal to the width W of the tang 116.

The tabs 120 include a radius portion, generally designated 124. In one embodiment, the radius portion 124 is generally semi-circular. In another embodiment, the radius portion 124 includes a first radius 126 that is generally quarter-circular and a second radius 128 that is generally quarter circular. In the subject embodiment, the radius portion 124 of the tab 120 is sized to be greater than the minimum bend radius of the optical fiber 28. In the subject embodiment, and by way of example only, the radius portion 124 includes a radius that is in the range of about 0.05 inches to about 0.2 inches. In another embodiment, the radius of the radius portion 124 is about 0.1 inches.

In the subject embodiment, each of the tabs 120 defines a cavity 129 (shown in FIG. 4) that may be advantageous as it provides a wall thickness for the tabs 120 that is similar to the wall thicknesses of the first portion 104 and the second portion 106. This uniform wall thickness may be an advantageous design for manufacturing the edge protector 100 using conventional plastic injection molding techniques. It will be understood, however, that the scope of the present disclosure is not limited to the tabs 120 defining cavities 129 or to the wall thicknesses of the edge protector 100 being uniform.

Figure 7:
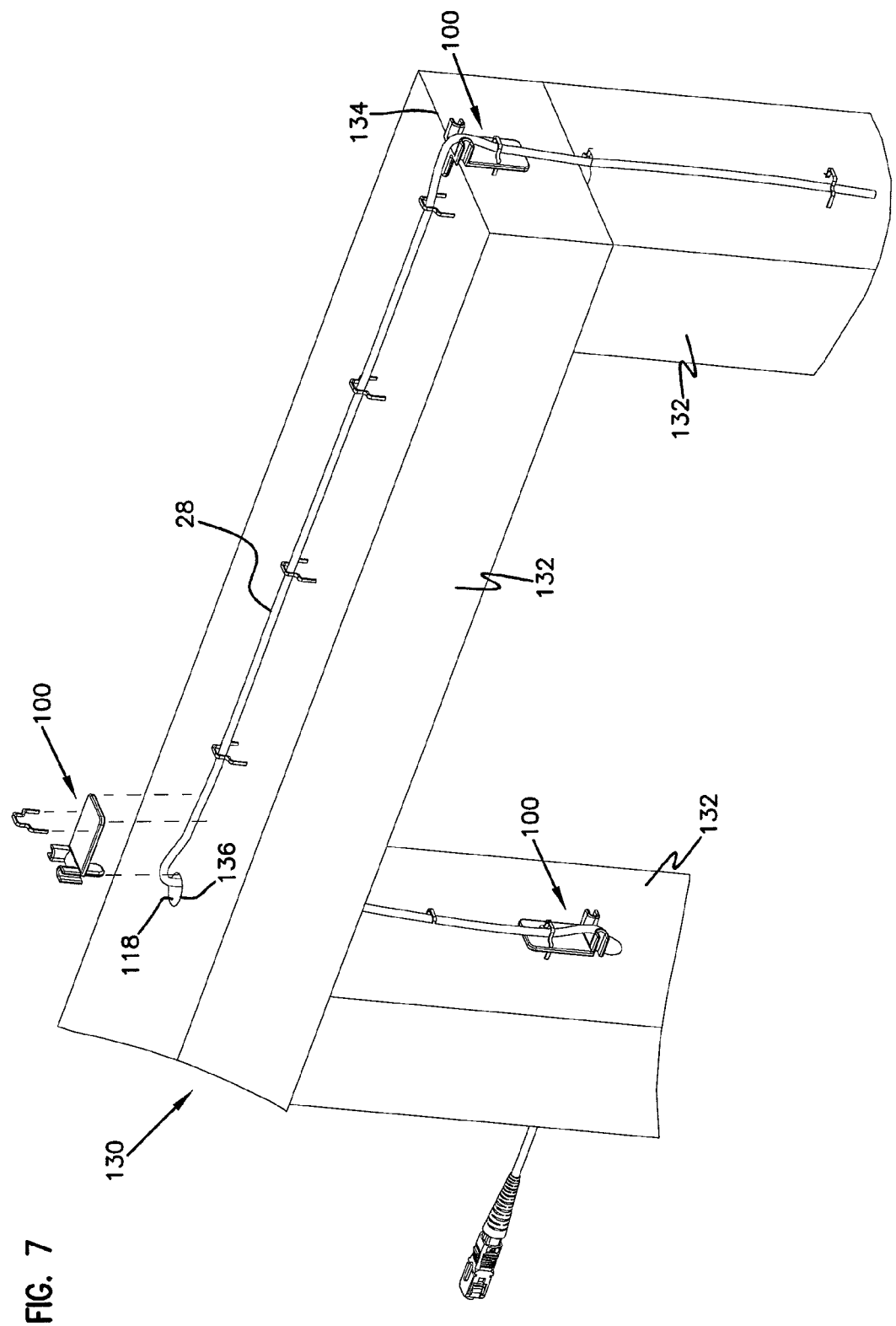
FIG. 7 is a fragmentary perspective view of a structure suitable for routing optical fibers.

Referring now to FIG. 7, a method for routing cable will be described. While the cable routing method and the edge protector 100 will be described with regard to the optical fibers 28, it will be understood that the present disclosure is not limited to optical fibers 28 as the method could also be used with the subscriber cable 22 and the intermediate cable 26.

FIG. 7 provides an exemplary fragmentary structure, generally designated 130, over/through which the optical fiber 28 is routed. In the subject embodiment, the structure 130 includes a plurality of supports 132, such as 2×4 or 4×4 wooden studs. The supports 132 include a plurality of corner edges 134 and holes 118 having outer edges 136. Typically, the corner edges 134 of the supports 132 and the outer edges 136 of the holes 118 in the supports 132 are formed by the intersection of two surfaces, which are generally perpendicular. As a result of the perpendicularity of the surfaces forming the corner edges 134 and the outer edges 136, optical fibers 28 that are bent over the corner edges 134 and outer edges 136 are at a risk of attenuation since the bend incurred by the optical fibers 28 as those optical fibers 28 are routed around the corner edges 134 and the outer edges 136 is greater than the maximum permissible bend.

Figure 8:
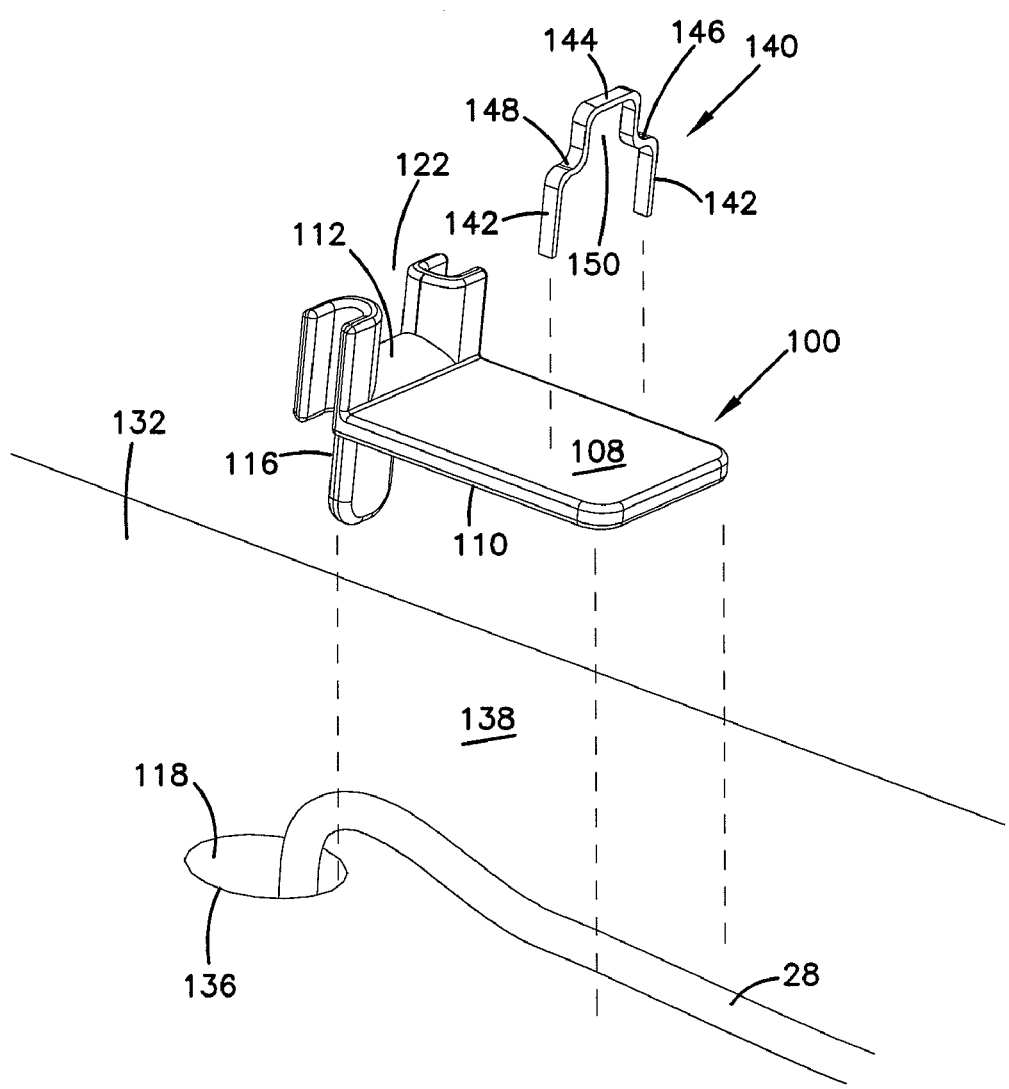
FIG. 8 is an exploded fragmentary perspective view of the edge protector being inserted into a hole.

The edge protector 100 is adapted for insertion into the holes 118 and installation over the corner edges 134. Referring now to FIG. 8, the insertion of the edge protector 100 into the hole 118 will be described.

The edge protector 100 is disposed against the support 132 such that the tang 116 of the edge protector 100 is disposed in the hole 118 and the second surface 110 abuts a main surface 138 of the support 132. With the second surface 110 abutting the main surface 138 of the support 132, the tang 116 of the edge protector 100 is positioned within the hole 118 such that the tang 116 is adjacent to the outer edge 136.

With the tang 116 of the edge protector 100 disposed in the hole 118, the optical fiber 28 can be properly positioned over the edge protector 100. To properly position the optical fiber 28 over the edge protector 100, the optical fiber 28 is routed over the radius protrusion 112. In the subject embodiment, the optical fiber 28 is routed through the channel 122. With the optical fiber 28 properly positioned over the edge protector 100, the optical fiber 28 and the edge protector 100 can be secured to the support 132. In one embodiment, a fastener (e.g., staple, adhesive, tack, etc.), generally designated 140, is used to secure the optical fiber 28 to the edge protector 100 and to secure the edge protector 100 to the support 132. In the subject embodiment, the fastener 140 passes through the body 102 of the edge protrusion 100 and engages the support 132. As previously stated, the thickness of the body 102 affects the ability to secure the edge protector 100 to the support 132. For example, if the body 102 is thick, more force will be required to drive the fastener 140 through the body 102 than if the body 102 is thin.

In the subject embodiment, the fastener 140 includes prongs 142 that are adapted to extend through the edge protector 100. The fastener 140 further includes a cross bar portion 144 having a first end portion 146 and a second end portion 148. The cross bar portion 144 defines a cable recess 150 that is adapted to receive the optical fiber 28.

With the optical fiber 28 properly positioned over the edge protector 100, the fastener 140 is driven through the first surface 108 of the edge protector 100 such that the prongs 142 extend through the body 102 of the edge protector 100 and into the support 132. In the subject embodiment, the fastener 140 can be driven into the edge protector 100 with a tool such as a stapler or a hammer. As the fastener 140 is driven into the edge protector 100, the first and second end portions 146, 148 of the cross bar portion 144 abut the first surface 108 of the edge protector 100. This abutment secures the edge protector 100 to the support 132. The fastener 140 is positioned on the edge protector 100 such that the optical fiber 28 passes through the cable recess 150 of the cross bar portion 144.

As depicted in FIG. 7, the fastener 140 can also be used to secure the optical fiber 28 to the support 132. The fastener 140 is positioned over the optical fiber 28 such that the optical fiber passes through the cable recess 150. The fastener 140 is then driven into the support 132.

Figure 9:
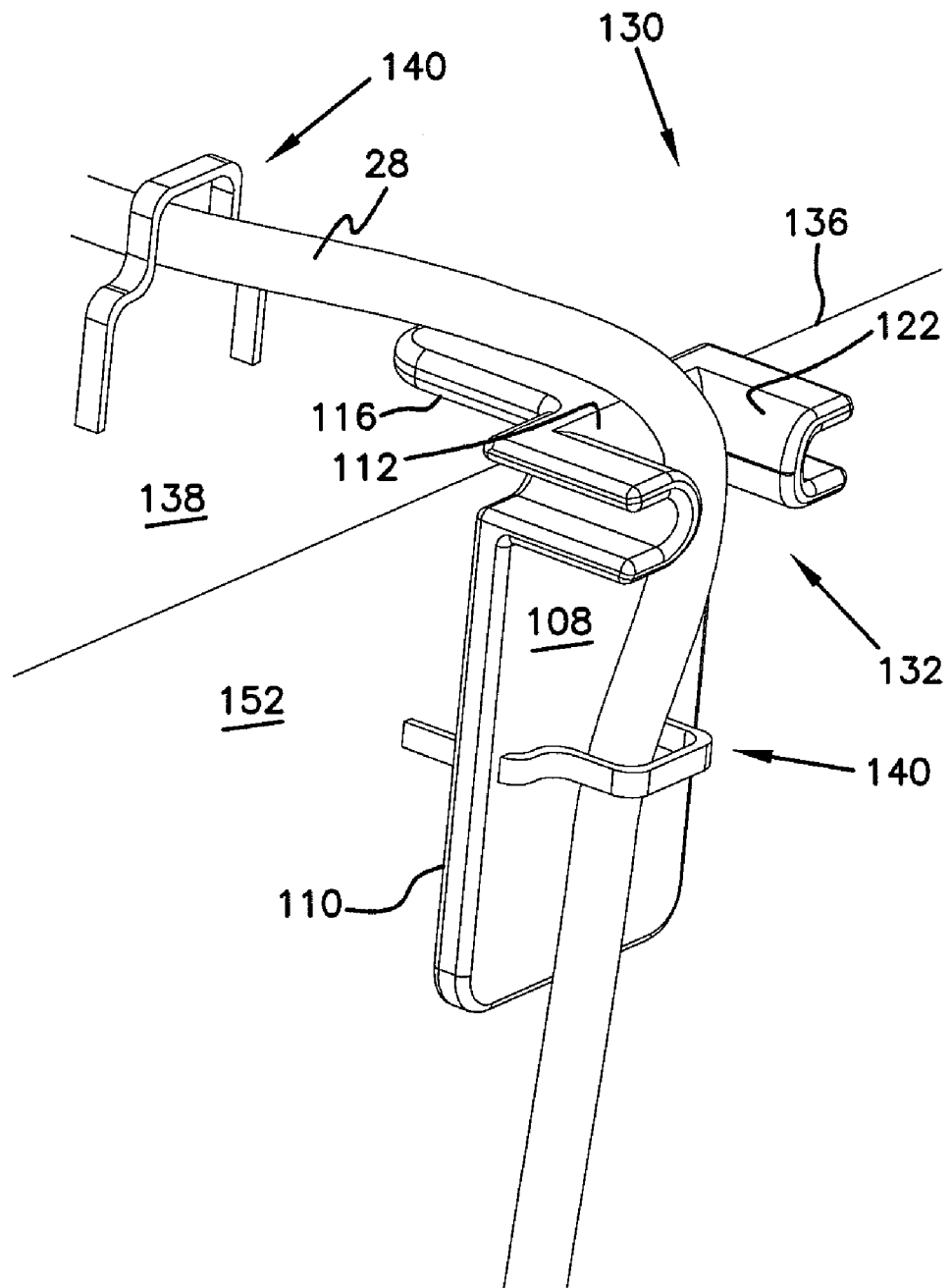
FIG. 9 is a fragmentary perspective view of the edge protector installed over a corner edge.

Referring now to FIG. 9, the installation of the edge protector 100 over the corner edge 134 will be described. The second surface 110 of the edge protector 100 abuts a secondary surface 152 of the support 132. With the second surface 110 of the edge protector 100 abutting the secondary surface 152, the tang 116 of the edge protector is positioned such that it abuts the main surface 138.

The optical fiber 28 is then positioned relative to the edge protector 100 such that the optical fiber passes over the radius protrusion 112 of the edge protector 100. In the subject embodiment, the optical fiber 28 is routed through the channel 122 of the edge protector 100. With the optical fiber 28 properly positioned with respect to the edge protector 100, the fastener 140 can be used to secure the edge protector 100 to the support 132.

As the radius protrusion 112 includes a radius R that does not violate the maximum bend rating of the optical fiber 28, the edge protector 100 reduces the risk of attenuation losses caused by routing the optical fiber over structures 130 having sharp edges. With the tang 116 having the width W that is sized for insertion in the hole 118, the edge protector 100 can be used to minimize the risk of attenuation losses caused by corner edges 134 and outer edges 136 of holes 118.

Figure 10:
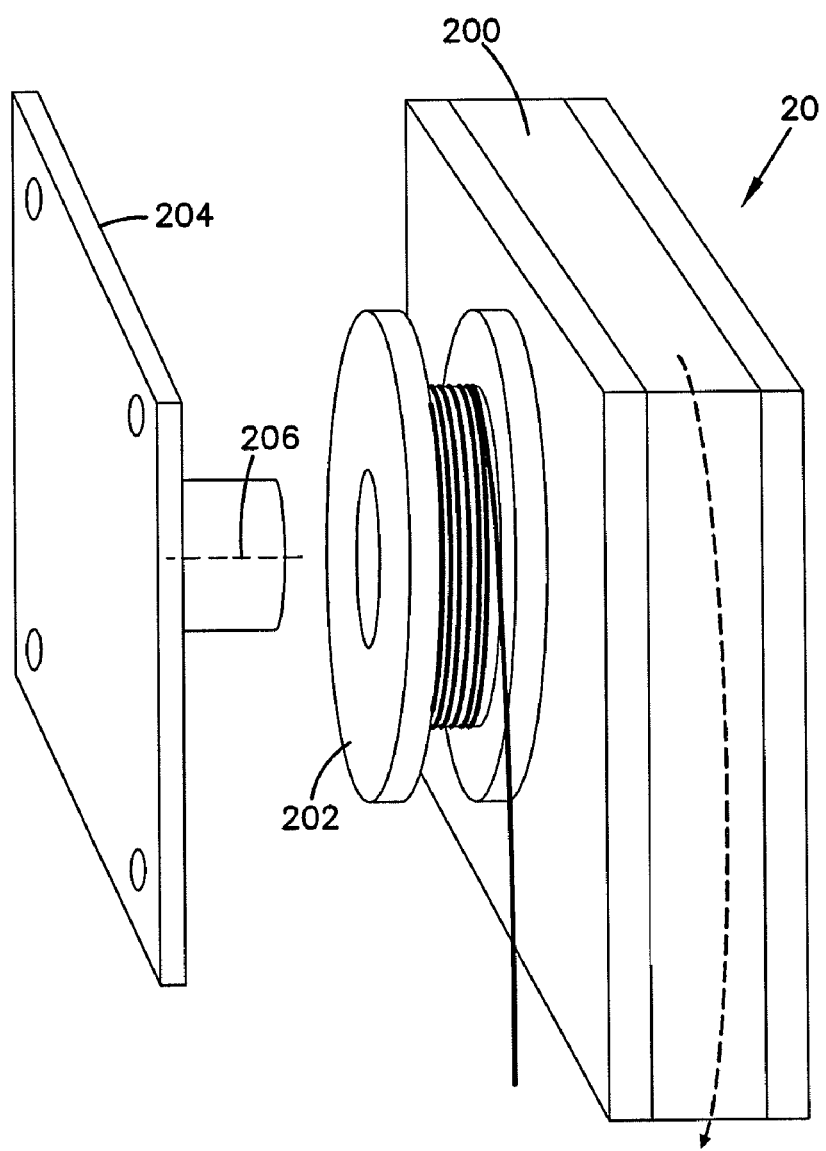
FIG. 10 is a perspective view of a fiber optic enclosure suitable for use in the fiber optic network of FIGS. 1 and 2.

As previously stated, the fiber optic network 10 in the multiple dwelling unit 12 includes the fiber distribution hub 16 and the fiber optic enclosure 20. In the exemplary embodiment of the fiber optic enclosure shown in FIG. 10, the fiber optic enclosure 20 includes a housing 200 having a cable spool assembly 202 disposed on an exterior surface of the housing 200. A mounting plate 204 is engaged with the cable spool assembly 202 such that the cable spool assembly 202 and the housing 200 can selectively and unitarily rotate about an axis 206 of the mounting plate 204.

The fiber optic enclosure 20 is in optical communication with the fiber distribution hub 16 through the subscriber cable 22. The fiber optic enclosure 20 is also in optical communication with the end location 30 in the multiple dwelling unit 12 through the optical fibers 28. A plurality of edge protectors 100 are disposed throughout the multiple dwelling unit 12 to protect the optical fibers 28 and/or the subscriber cable 22 for attenuation as those optical fibers 28 and/or subscriber cable 22 are routed through the multiple dwelling unit 12.

In one embodiment, the fiber distribution hub 16, the fiber optic enclosure 20, and the edge protectors 100 would comprise a fiber optic network kit. In another embodiment, the fiber distribution hub 16, the fiber optic enclosure 20, fiber optic cables that are adapted for connection between the fiber distribution hub 16 and the fiber optic enclosure 20, optical fibers 28 that are adapted for connection between the end location 30 and the fiber optic enclosure 20, and a plurality of edge protectors would comprise the kit.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An edge protector for fiber optic cables comprising:
    a body having:
        a first portion including a first surface and an oppositely disposed second surface;
        a second portion engaged to the first portion, the second portion including:
            a radius protrusion having a radius;
            a tang extending from the radius protrusion in a first direction that is outward from the second surface of the first portion; and
            a plurality of tabs extending from the radius protrusion in a second direction that is opposite the first direction, the plurality of tabs and the radius protrusion defining a channel, each of the tabs including a radius portion having a convex side that faces the channel.

2. An edge protector as claimed in claim 1, wherein radius of the radius protrusion defines a center that is aligned with the first surface such that the radius protrusion extends outwardly from the first surface.

3. An edge protector as claimed in claim 2, wherein the radius protrusion is tangent to the tang.

4. An edge protector for fiber optic cables as claimed in claim 1, wherein there are two tabs.

5. An edge protector for fiber optic cables as claimed in claim 1, wherein the radius portion of each of the tabs is semi-circular.

* * * * *